United States Patent
Khude et al.

(10) Patent No.: US 9,042,903 B2
(45) Date of Patent: May 26, 2015

(54) METHODS AND APPARATUS FOR EFFICIENT CO-EXISTENCE OF MACRO AND SMALL CELLS

(71) Applicant: QUALCOMM Incorporated, San Diego, CA (US)

(72) Inventors: Nilesh Khude, Bridgewater, NJ (US); Saurabha Rangrao Tavildar, Jersey City, NJ (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/738,936

(22) Filed: Jan. 10, 2013

(65) Prior Publication Data

US 2014/0194130 A1    Jul. 10, 2014

(51) Int. Cl.
*H04W 56/00*     (2009.01)

(52) U.S. Cl.
CPC ........ *H04W 56/001* (2013.01); *H04W 56/0045* (2013.01)

(58) Field of Classification Search
CPC ............ H04W 56/00; H04W 56/0005; H04W 56/001; H04W 56/0015; H04W 56/004; H04W 56/0045; H04W 56/0055; H04W 56/0065; H04W 56/007; H04W 84/045; H04W 16/16; H04W 16/32; H04B 7/269; H04J 3/0635–3/0638
USPC .............. 455/422.1, 450, 501, 502, 446–449; 370/350, 336, 329, 328, 343, 503
See application file for complete search history.

(56) References Cited

U.S. PATENT DOCUMENTS

| | | | | |
|---|---|---|---|---|
| 5,363,376 | A * | 11/1994 | Chuang et al. | 370/332 |
| 6,888,819 | B1 * | 5/2005 | Mushkin et al. | 370/350 |
| 8,160,101 | B2 | 4/2012 | Kwak et al. | |
| 8,254,369 | B2 * | 8/2012 | Ono | 370/350 |
| 2006/0198354 | A1 * | 9/2006 | Costa | 370/350 |
| 2010/0157906 | A1 | 6/2010 | Yang et al. | |
| 2010/0222068 | A1 * | 9/2010 | Gaal et al. | 455/450 |

(Continued)

FOREIGN PATENT DOCUMENTS

| GB | 2489743 | A | 10/2012 |
|---|---|---|---|
| GB | 2489743 | A * | 10/2012 |

OTHER PUBLICATIONS

International Search Report and Written Opinion—PCT/US2014/011115—ISA/EPO—Apr. 10, 2014.

*Primary Examiner* — George Eng
*Assistant Examiner* — Umair Ahsan
(74) *Attorney, Agent, or Firm* — James K. O'Hare

(57) ABSTRACT

A femto base station (BS) maintains two different timings: a femto BS downlink timing and a femto BS uplink timing. A femto base station's uplink reference timing is based on the macro uplink timing being used by one or more UE devices in the local vicinity of the femto BS. In some embodiments, the femto BS synchronizes its femto uplink timing to the macro uplink timing being used by the closest UE device transmitting uplink signals to the macro BS. In other embodiments, the femto BS determines its femto base station uplink timing based on one or more uplink signals from UE devices in its vicinity transmitting to the macro BS. In various embodiments, femto cell uplink signals and macro cell uplink signals are received at a femto cell BS in synchronization. This approach facilitates frequency division multiplexing (FDM) in the uplink between a macro cell and a femto cell.

17 Claims, 14 Drawing Sheets

(56) References Cited

U.S. PATENT DOCUMENTS

| | | |
|---|---|---|
| 2011/0080896 A1 | 4/2011 | Krishnamurthy et al. |
| 2011/0116481 A1 | 5/2011 | Wang |
| 2011/0255501 A1 | 10/2011 | Kwon |
| 2012/0003970 A1* | 1/2012 | Iwamura ................ 455/422.1 |
| 2012/0003985 A1* | 1/2012 | Guvenc et al. ............ 455/452.2 |
| 2012/0052855 A1* | 3/2012 | Soliman et al. ........... 455/422.1 |
| 2012/0178482 A1* | 7/2012 | Seo et al. .................... 455/501 |
| 2013/0344878 A1* | 12/2013 | Whinnett ..................... 455/450 |
| 2014/0016626 A1* | 1/2014 | Dai et al. ..................... 370/336 |

* cited by examiner

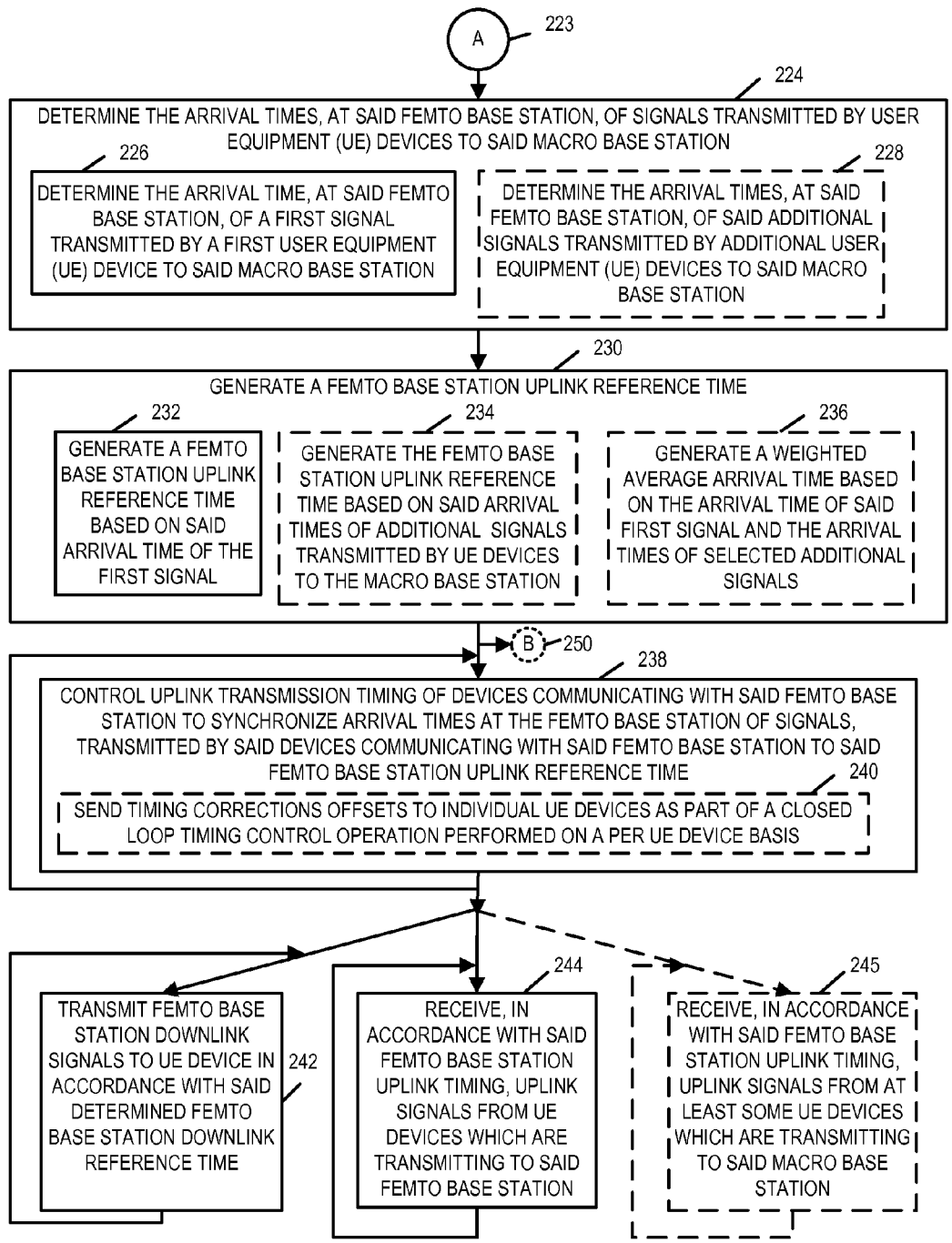

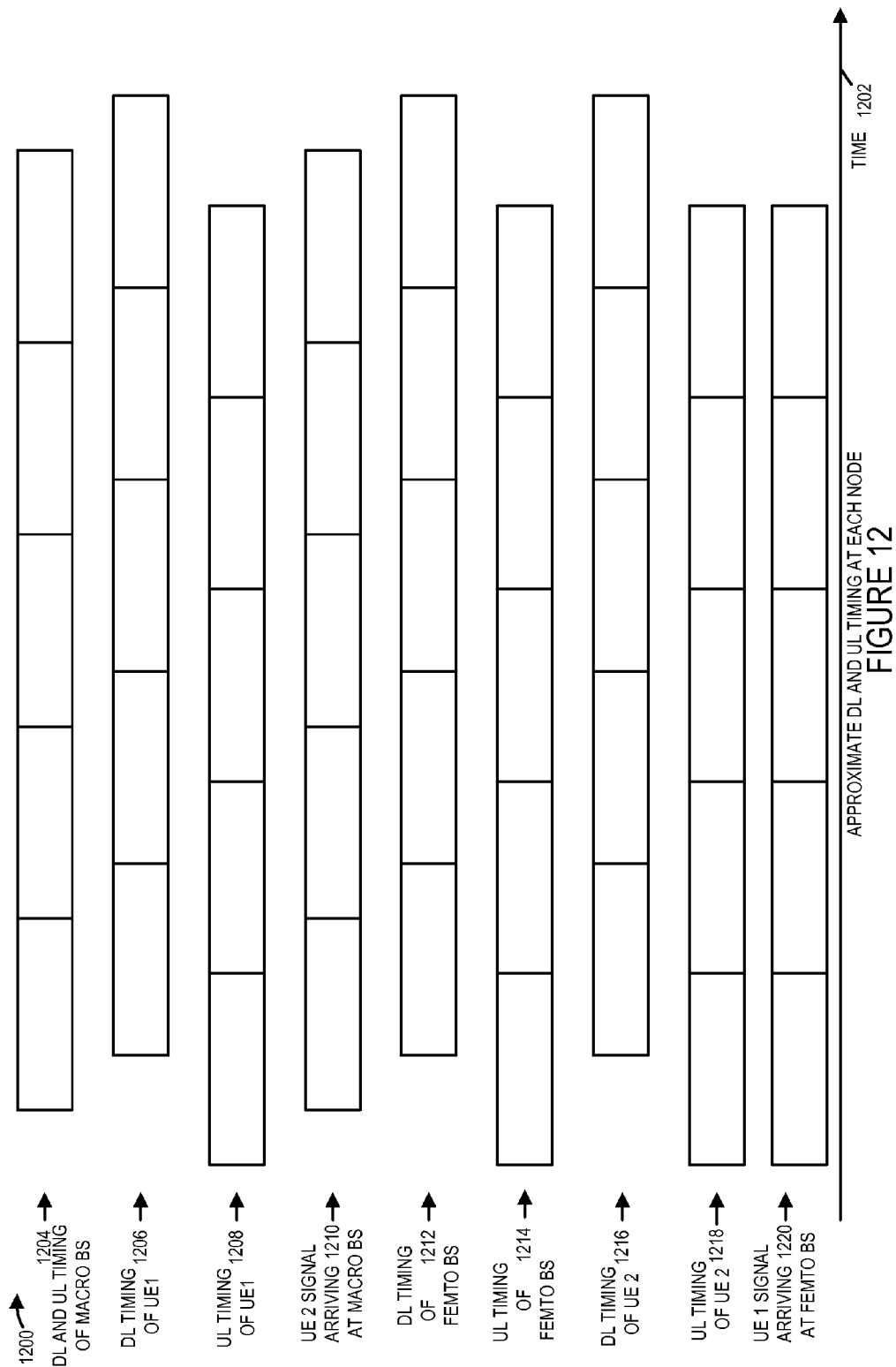

METHODS AND APPARATUS FOR EFFICIENT CO-EXISTENCE OF MACRO AND SMALL CELLS

FIELD

Various embodiments relate to wireless communications, and more particularly to methods and apparatus for efficiently deploying small cells, e.g., femto cells, within the coverage area of macro cells.

BACKGROUND

Two problems typically occur in present small cell, e.g., femto cell, deployments. In a dense deployment of small cells, e.g., femto cells, many small cell base stations are idle most of the time. However, such cells normally transmit pilot and other information even when not serving a UE (user equipment) device. While it might be desirable to control transmission of signals based on detected and decoded signals from a UE device, it may be difficult for a small cell base station to detect and decode a signal from a UE device, since the uplink (UL) transmission timing used by the UE device is normally specific to its own intended receiver and not the small cell base station which may try to detect its presence. Thus a small cell base station trying to detect UE devices in a conventional system may need to keep at least two UL timings. One UL timing is for UE devices with which the small cell base station is in communication and a second UL timing is for UE devices, which are not in communication with the small cell base station but are in communication with a macro cell base station or other small cell base station and which the small cell base station is trying to detect.

A second problem is that of interference coordination. Deployments of small cells (femtos) operating in the same band as that of a macro cell cause interference to both UL and DL (downlink) transmissions of macro and small cells. Scheduling traffic in macro and small cells may benefit from interference coordination techniques. One solution to this problem is to leave a few subframes blank for small cell transmissions. The macro cell does not use these subframes. Time division of resources creates a tradeoff between a fraction of subframes allocated to small cells and latency of small cell traffic. In LTE, it also mandates that small cells get at least a portion (e.g., $\frac{1}{8}^{th}$) of the resources; which may be wasteful if the small cells do not need so many resources. Frequency division of resources can address this problem. While frequency division multiplexing (FDM) between a macro cell and small cells is possible in the DL, it is not possible in the uplink in typical deployments as the UEs, often located at different distances from a base station, use different UL transmission timings. The UL transmissions are typically not synchronous both at macro and femto.

These problems are depicted in FIGS. 1 and 2. Drawing 2100 of FIG. 1 illustrates a typical deployment of a macro base station 2102 and a femto base station 2104. In FIG. 1, user equipment device 1 (UE 1) 2106 is shown communicating with the macro base station 2102; user equipment device 2 (UE 2) 2108 is shown communicating with the femto base station 2104. The transmission range of a small cell, e.g., a femto cell, is much smaller than the transmission range of a macro cell. Hence the UL and DL timing used by a UE in communication with a small cell base station, e.g., a femto base station, are almost the same. Also, note that the small cell base station acquires its DL timing by listening to DL transmissions of the macro cell.

Drawing 2200 of FIG. 2 illustrates exemplary UL and DL timing at each node (macro base station 2102, UE device 1 2106, femto base station 2104, UE device 2 2108) of FIG. 1. Horizontal line 2202 represents time. First row 2204 is used to illustrate DL and UL timing of the macro base station 2102; second row 2206 is used to illustrate DL timing of UE 1 2106 (i.e., the timing of signals received by UE 1 2106 from macro base station 2102); third row 2208 is used to illustrate UL timing of UE 1 2106 (e.g., the timing of uplink signals transmitted by UE 1 2106). Fourth row 2210 is used to illustrate timing of a UE 2 2108 transmitted signal arriving at macro base station 2102. Fifth row 2212 is used to illustrate DL and UL timing of the femto base station 2104; sixth row 2214 is used to illustrate DL timing of UE 2 2108; seventh row 2216 is used to illustrate UL timing of UE 2 2108. Eighth row 2218 is used to illustrate timing of a UE 1 2106 transmitted signal arriving at femto base station 2104. Note the discrepancy in the different uplink times. In particular with regard to the macro base station reception of uplink signals, there is a misalignment as indicated by the timing misalignment between the blocks of row 2204 and row 2210. Also, with regard to the femto base station 2104 reception of uplink signals, there is a misalignment, as indicated by the timing misalignment between the blocks of row 2212 and row 2218.

Based on the above discussion, it should be appreciated that there is a need for new methods and apparatus which can reduce interference between femto cell and macro cell communications and/or facilitate FDM in the uplink between macro cells and femto cells.

SUMMARY

Various embodiments are directed to methods and apparatus for operating a femto base station to support efficient co-existence with a macro base station. In various embodiments, a femto base station maintains two different timings: a femto base station downlink timing and a femto base station uplink timing. In some embodiments, a femto base station's uplink timing is based on the macro uplink timing being used by one or more user equipment devices in the local vicinity of the femto base station. For example, in some embodiments, the femto base station synchronizes its femto uplink timing to the macro uplink timing being used by the closest user equipment device transmitting uplink signals to the macro base station. In other embodiments, the femto base station determines its femto base station uplink timing based on one or more uplink signals from UE devices in its vicinity transmitting to the macro base station.

In various embodiments, femto cell uplink signals and macro cell uplink signals are received at a femto cell base station in synchronization, e.g., to within the duration of a cyclic prefix. Moreover in these embodiments, femto cell uplink signals and macro cell uplink signals are received at a macro cell base station in synchronization, e.g., to within the duration of a cyclic prefix. This approach facilitates frequency division multiplexing (FDM) in the uplink between macro cell UEs and femto cell UEs in a femto cell included within the macro cell.

An exemplary method of operating a femto base station within a coverage area of a macro base station, in accordance with some embodiments, includes determining the arrival time, at said femto base station, of a first signal transmitted by a first UE device to said macro base station and generating a femto base station uplink reference time based on said determined arrival time of the first signal. The exemplary method further includes controlling uplink transmission timing of devices communicating with said femto base station to synchronize arrival times at said femto base station of signals, transmitted by said devices communicating with said femto base station to said femto base station uplink reference time.

An exemplary femto base station within the coverage area of a macro base station, in accordance with some embodiments, includes at least one processor configured to: determine the arrival time, at said femto base station, of a first signal transmitted by a first UE device to said macro base station; and generate a femto base station uplink reference time based on said determined arrival time of the first signal. In various embodiments, the at least one processor is further configured to control uplink transmission timing of devices communicating with said femto base station to synchronize arrival times at said femto base station of signals, transmitted by said devices communicating with said femto base station to said femto base station uplink reference time. The exemplary femto base station further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 4B is a second part of a flowchart of an exemplary method of operating a femto base station within a coverage area of a macro base station in accordance with various exemplary embodiments.

FIG. 12 illustrates exemplary UL and DL timing at each node (macro base station, UE device 1, femto base station, and UE device 2) shown in FIG. 11 in accordance with an exemplary embodiment.

DETAILED DESCRIPTION

Figure 1:
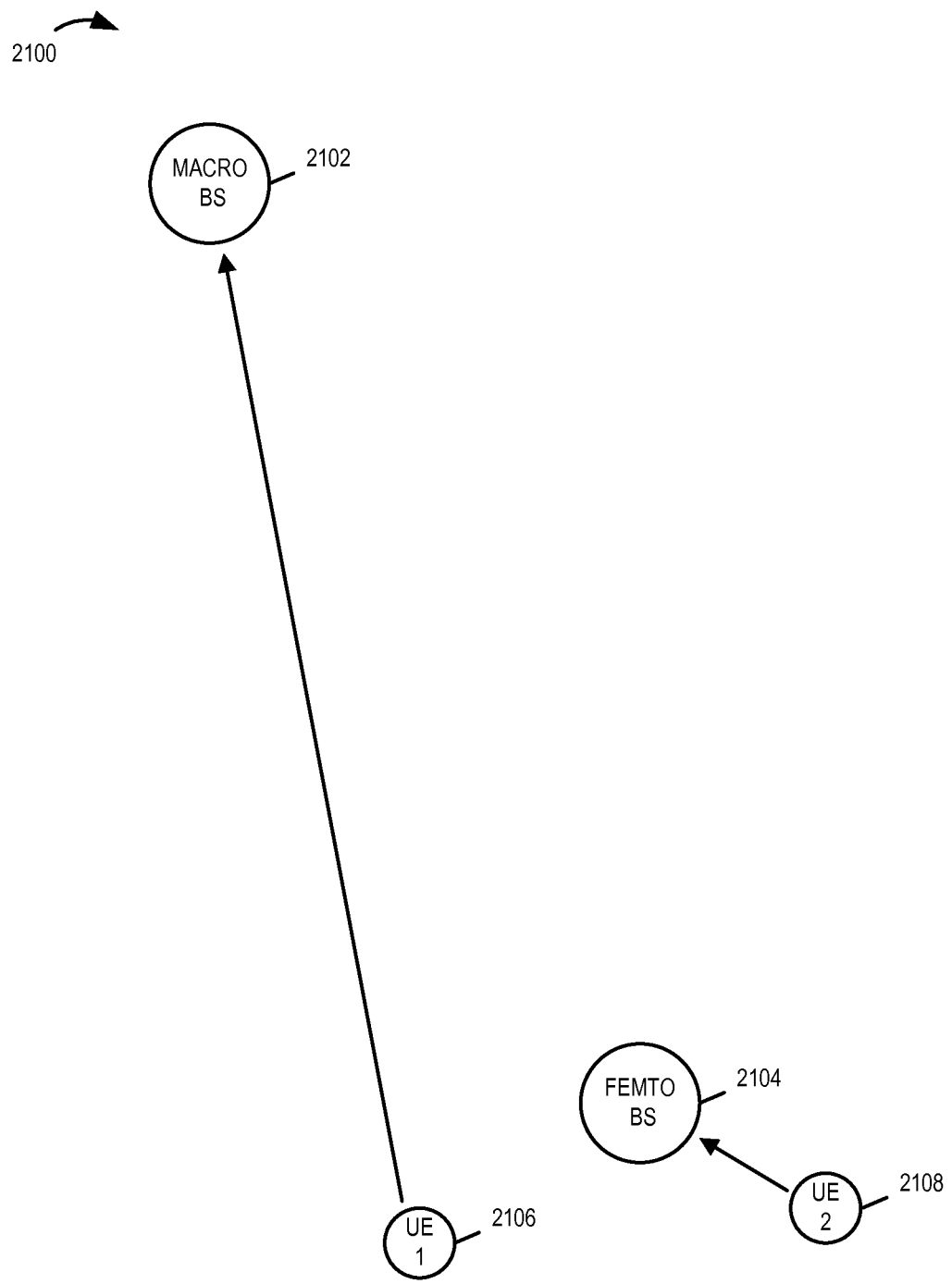
FIG. 1 illustrates a typical deployment of a femto cell base station within the coverage area of a macro cell base station.
Figure 2:
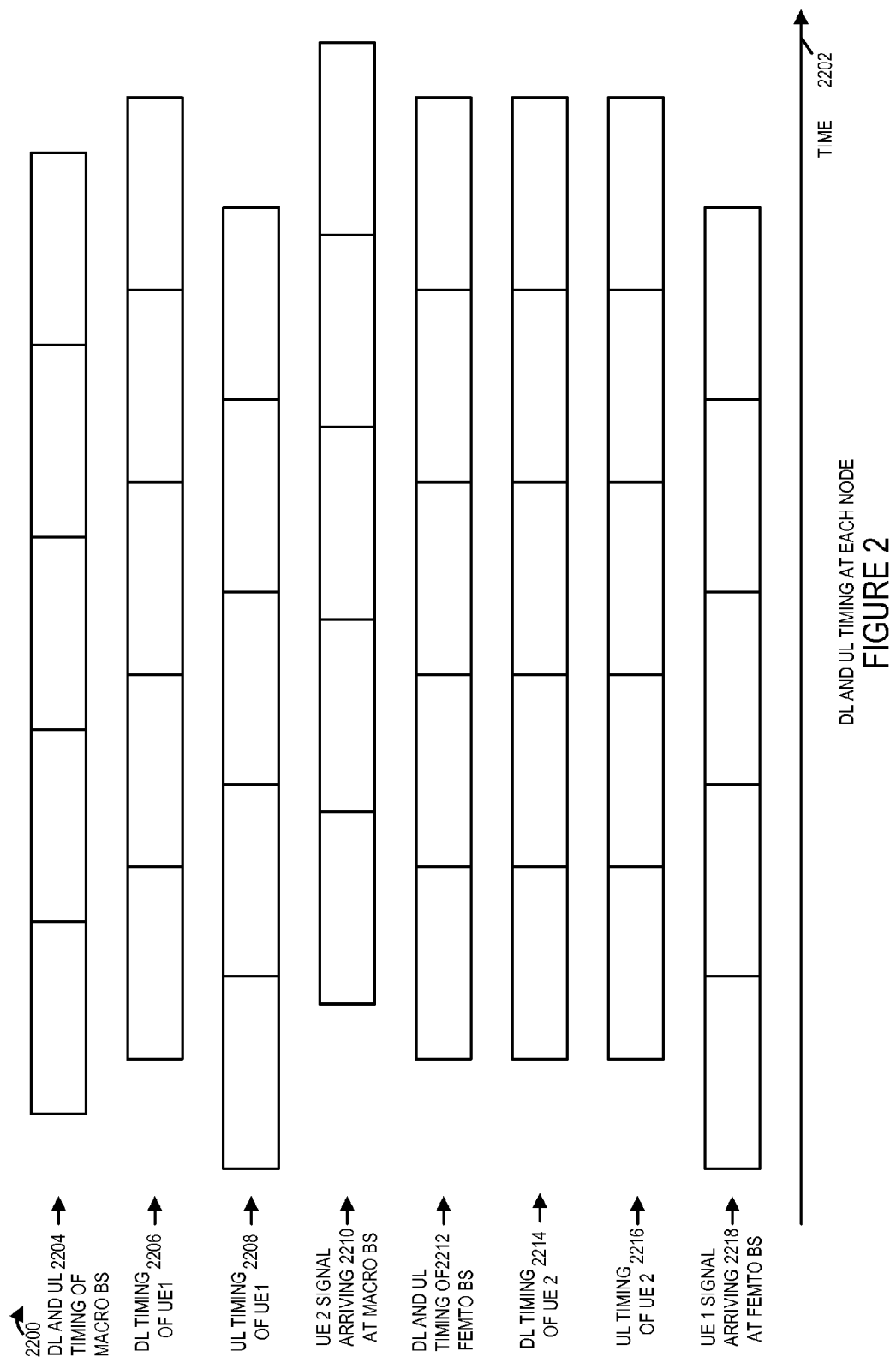
FIG. 2 illustrates exemplary UL and DL timing at each node corresponding to the example of FIG. 1.
Figure 3:
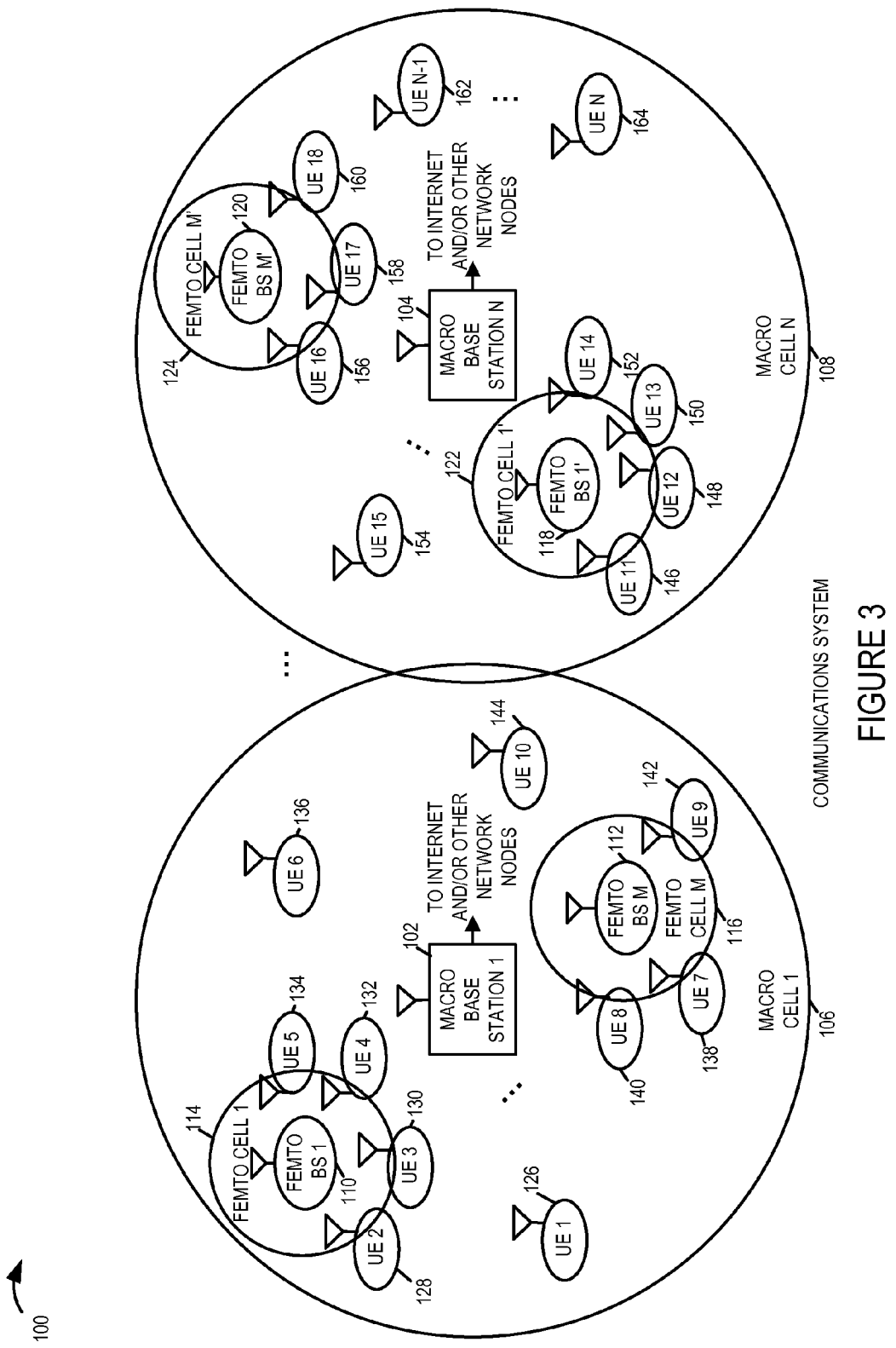
FIG. 3 is a drawing of an exemplary wireless communications system in accordance with various embodiments.

FIG. 3 is a drawing of an exemplary wireless communications system 100 in accordance with various embodiments. Exemplary wireless communications system 100 includes a plurality of macro base stations (macro base station 1 102, . . . , macro base station N 104) and a plurality of corresponding macro cells (macro cell 1 106, . . . , macro cell N 108). Within each macro cell, there are a plurality of femto base stations and a plurality of corresponding femto cells. Within macro cell 1 106, there are a plurality of femto base stations (femto base station 1 110, . . . , femto base station M 112) with corresponding femto cells (femto cell 1 114, . . . , femto cell M 116). Similarly, within macro cell N 108, there are a plurality of femto base stations (femto base station 1' 118, . . . , femto base station M' 120) with corresponding femto cells (femto cell 1' 122, . . . , femto cell M' 124). System 100 further includes a plurality of user equipment (UE) devices (UE 1 126, UE 2 128, UE 3 130, UE 4 132, UE 5 134, UE 6 136, UE 7 138, UE 8 140, UE 9 142, UE 10 144, UE 11 146, UE 12 148, UE 13 150, UE 14 152, UE 15 154, UE 16 156, UE 17 158, UE 18 160, . . . , UE (N−1) 162, UE N 164) which may move throughout the system 100 and communicate with a macro base station and/or a femto base station in whose cell it is located.

In various embodiments, a femto base station, e.g., femto base station 1 110, determines its femto base station UL timing based upon one or more received UL signals transmitted by UE devices, in its local vicinity, which are communicating with a macro base station having a coverage area in which the femto base station is located. In some such embodiments, the femto base station uplink timing is controlled such that UL signals transmitted by UE devices to the femto base station arrive in synchronization, e.g., to within the duration of a cyclic prefix, with uplink signals transmitted by UE devices to a macro base station. This approach facilitates interference coordination between the macro and the femto communications and allows for frequency division multiplexing (FDM) to be used between a macro cell and femto cells in the UL.

Figure 4A:
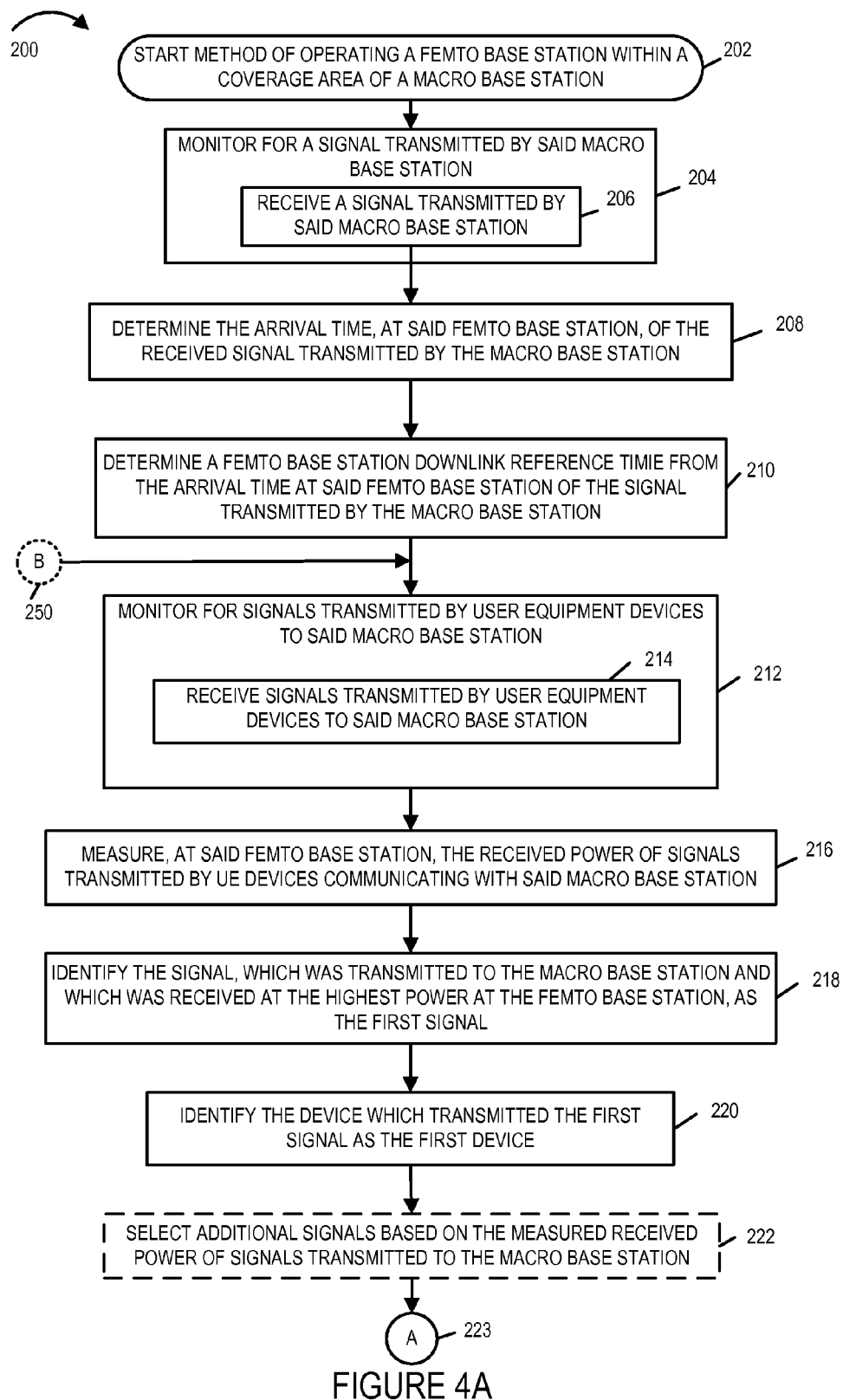
FIG. 4A is a first part of a flowchart of an exemplary method of operating a femto base station within a coverage area of a macro base station in accordance with various exemplary embodiments.

FIG. 4, comprising the combination of FIG. 4A and FIG. 4B, is a flowchart 200 of an exemplary method of operating a femto base station within a coverage area of a macro base station in accordance with various exemplary embodiments. Operation of the exemplary method starts in step 202, where the femto base station is powered on and initialized. Operation proceeds from step 202 to step 204.

In step 204, the femto base station monitors for a signal transmitted by said macro base station. Step 204 includes step 206 in which the femto base station receives a signal transmitted by the macro base station. Operation proceeds from step 206 to step 208.

In step 208, the femto base station determines the arrival time, at the femto base station, of the received signal transmitted by the macro base station. Operation proceeds from step 208 to step 210. In step 210, the femto base station determines a femto base station downlink reference time from the arrival time at said femto base station of the signal transmitted by the macro base station. Operation proceeds from step 210 to step 212.

In step 212, the femto base station monitors for signals transmitted by user equipment devices to said macro base station. Step 212 includes step 214 in which the femto base station receives signals transmitted by user equipment devices to said macro base station. Operation proceeds from step 214 to step 216.

In step 216, the femto base station measures, at the femto base station, the received power of signals transmitted by UE devices communicating with the macro base station. Operation proceeds from step 216 to step 218. In step 218, the femto base station identifies the signal which was transmitted to the macro base station and which was received at the highest power at the femto base station, as the first signal. Operation proceeds from step 218 to step 220. In step 220, the femto base station identifies the device which transmitted the first signal as the first device. In some embodiments, operation proceeds from step 220 to step 222. In some other embodiments, operation proceeds from step 220 to step 224.

Returning to step 222, in step 222 the femto base station selects additional signals based on the measured received power of signals transmitted to the macro base station. In some embodiments, the additional signals which are selected are the highest power received signals after the first signal. In various embodiments, the selected additional signals are signals which satisfy a minimum threshold power level indicative of being near the femto base station. Operation proceeds from step 222 to step 224, via connecting node A 223. In step 224, the femto base station determines the arrival times, at the femto base station, of signals transmitted by user equipment (UE) devices to said macro base station. Step 224 includes step 226, and in some embodiments, further includes step 228. In step 226, the femto base station determines the arrival time at the femto base station of the first signal transmitted by the first user equipment (UE) device to said macro base station. In some embodiments, the first signal is one of a plurality of signals transmitted by UE devices communicating with said macro base station. In step 228, the femto base station determines the arrival times, at the femto base station, of said additional signals transmitted by additional user equipment devices to said macro base station. Operation proceeds from step 224 to step 230.

In step 230, the femto base station generates a femto base station uplink reference time. Step 230 includes step 232. In some embodiments, step 230 further includes one or both of steps 234 and 236. Steps 232, 234 and/or 236 may be, and in some embodiments, are performed jointly. In step 232 the femto base station generates a femto base station uplink reference time based on said arrival time of the first signal. In step 234 the femto base station generates the femto base station uplink reference time based on the arrival times of additional signals transmitted by UE devices to the macro base station. In step 236 the femto base station generates a weighted average arrival time based on the arrival time of said first signal and the arrival times of selected additional signals.

Operation proceeds from step 230 to step 238, which is performed on an ongoing basis. In step 238 the femto base station controls uplink transmission timing of devices communicating with said femto base station to synchronize the arrival times at the femto base station of signals transmitted by said device communicating with said femto base station to the femto base station uplink reference time. In some embodiments, said synchronization of the arrival time at said femto base station is to within the duration of a cyclic prefix used by user equipment devices transmitting to said macro base station. In various embodiments, femto cell and macro cell communications use symbols with the same cyclic prefix length. In some embodiments, the synchronization of the arrival time at the femto base station is to within a duration that is shorter than said cyclic prefix. In various embodiments, the duration is intentionally shorter to account for possible slight distance variation of the UE from which a measurement was taken to the femto base station.

In various embodiments, step 238 includes step 240 in which the femto base station sends timing correction offsets to individual UE devices as part of a closed loop timing control operation performed on a per UE device basis. Operation proceeds from step 238 to steps 242 and 244, which are performed on an ongoing basis. In some embodiments, operation also proceeds from step 238 to step 245, which is performed on an ongoing basis.

In step 242, the femto base station transmits femto base station downlink signals to UE devices in accordance with said determined femto base station downlink reference time. In step 244, the femto base station receives, in accordance with said femto base station uplink timing, uplink signals from UE devices which are transmitting to said femto base station. In step 245, the femto base station receives, in accordance with said femto base station uplink timing, uplink signals from at least some UE devices which are transmitting uplink signals to said macro base station, e.g., some UE devices transmitting uplink signals to the macro base station which are in the local vicinity of the femto base station. In some embodiments, some of the signals received in step 244 are received concurrently, e.g., concurrently in the same subframe of a recurring timing structure, with some of the signals received in step 245, e.g., with FDM being used and the macro cell uplink and femto cell uplink sharing a spectrum.

In some embodiments, the femto base station determines the femto base station uplink—reference timing on a recurring basis, e.g., on a periodic basis, and operation proceeds from step 230, via connecting node B 250, to step 212.

Figure 5:
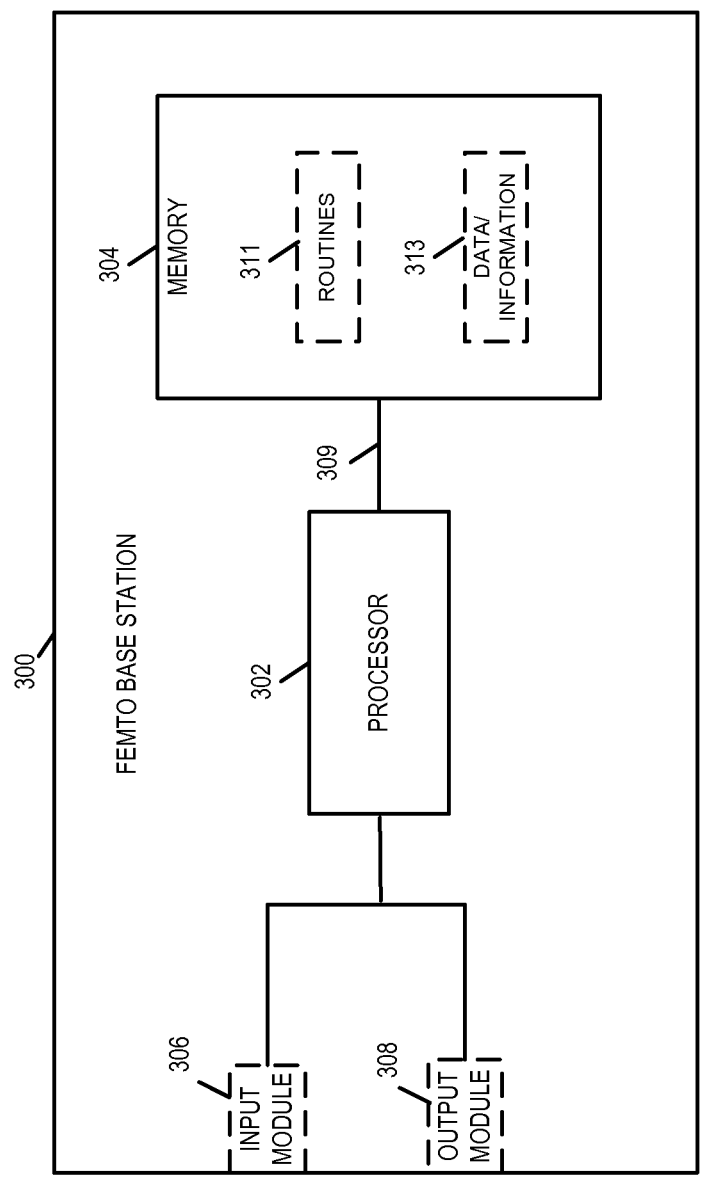
FIG. 5 is a drawing of an exemplary femto base station in accordance with an exemplary embodiment.

FIG. 5 is a drawing of an exemplary femto base station 300 in accordance with an exemplary embodiment. Exemplary femto base station 300 is, e.g., one of the femto base stations (110, 112, 118, 120) of system 100 of FIG. 3. Exemplary femto base station 300 may, and sometimes does, implement a method in accordance with flowchart 200 of FIG. 4.

Femto base station 300 includes a processor 302 and memory 304 coupled together via a bus 309 over which the various elements (302, 304) may interchange data and information. Femto base station 300 further includes an input module 306 and an output module 308 which may be coupled to processor 302 as shown. However, in some embodiments, the input module 306 and output module 308 are located internal to the processor 302. Input module 306 can receive input signals. Input module 306 include a wireless receiver for receiving input. In some embodiments, input module 306 further includes a wired and/or optical input interface for receiving input. Output module 308 includes a wireless transmitter for transmitting output. In some embodiments, output module 308 further includes a wired and/or optical output interface for transmitting output. In some embodiments, memory 304 includes routines 311 and data/information 313.

Femto base station 300 is located within the coverage area of a macro base station, e.g., one of the macro base stations (102, 104) of system 100 of FIG. 3. In various embodiments, processor 302 is configured to: determine the arrival time, at said femto base station, of a first signal transmitted by a first UE device to said macro base station; generate a femto base station uplink reference time based on said determined arrival time of the first signal; and control uplink transmission timing of devices communicating with said femto base station to synchronize the arrival times at said femto base station of signals transmitted by said devices communicating with said femto base station to said femto base station uplink reference time. In some embodiments, processor 302 is configured to send timing correction offsets to individual UEs as part of a closed loop timing control operation performed on a per UE basis, as part of being configured to control uplink transmission timing of devices.

In various embodiments, the first signal is one of a plurality of signals transmitted by UE devices communicating with said macro base station. In some embodiments, processor 302 is configured to control said synchronization of the arrival time at said femto base station to be within the duration of a cyclic prefix used by user equipment devices transmitting to said macro base station. In various embodiments, femto cell communications and macro cell communications use symbols with the same cyclic prefix length. In some embodiments, processor 302 is configured to control said synchronization to be within a duration that is shorter than said cyclic prefix. In some embodiments, the duration is controlled to be shorter than said cyclic prefix to account for possible slight distance variation of a UE from which a measurement was taken to the femto base station.

In some embodiments, processor 302 is further configured to measure, at said femto base station, the received signal power of signals transmitted by UE devices communicating with said macro base station. In some such embodiments, said first UE device is a UE device from which said femto base station received a highest power signal to said macro base station. In various embodiments, processor 302 is configured to measure the received power of signals transmitted by UE devices to the macro base station. In some embodiments, processor 302 is configured to identify if received signals, which were transmitted by UE device to the macro base station, were received at the femto base station at a power level exceeding a minimum threshold power level indicative of being near the femto base station. In some embodiments, processor 302 is configured to identify the received signal transmitted by a UE device to a macro base station, which was received at the femto base station at the highest received power.

In various embodiments, processor 302 is configured to generate the femto base station uplink reference time based on the arrival times of additional signals transmitted by UE devices to said macro base station, as part of being configured to generate a femto base station uplink reference time. In some embodiments, processor 302 is further configured to select said additional signals based on the measured received power of said signals transmitted to said macro base station. In some such embodiments, processor 302 is configured to select the signals received at the highest power, after the first signal, as the additional signals, since those signals were probably transmitted by UE devices which are the next closest to the femto base station. In some embodiments, for signals to be selected as additional signals and used in the femto base station uplink reference timing generation, the signals need to be received at a power level over a minimum threshold power level indicative of the UE device which transmitted the signal being near the femto base station. In some such embodiments, processor 302 is configured to screen received signals to determine whether or not one or more of the received signals are to be used in the femto uplink timing reference generation based on whether or not the power level of a received signal being screened exceeds the minimum threshold power level indicative of the UE device that transmitted the signal to the macro base station being near the femto base station.

In various embodiments, processor 302 is configured to generate a weighted average arrival time based on the arrival time of said first signal and the arrival times of said selected additional signals, as part of being configured to generate a femto base station uplink reference time. In some embodiments, processor 302 is configured to generate a femto base station uplink timing reference on a recurring basis. In some embodiments, processor 302 is configured to generate a femto base station uplink timing reference on a periodic basis.

In some embodiments, processor 302 is further configured to determine a femto base station downlink reference time from the time arrival at said femto base station of a signal transmitted by said macro base station.

Figure 6A:
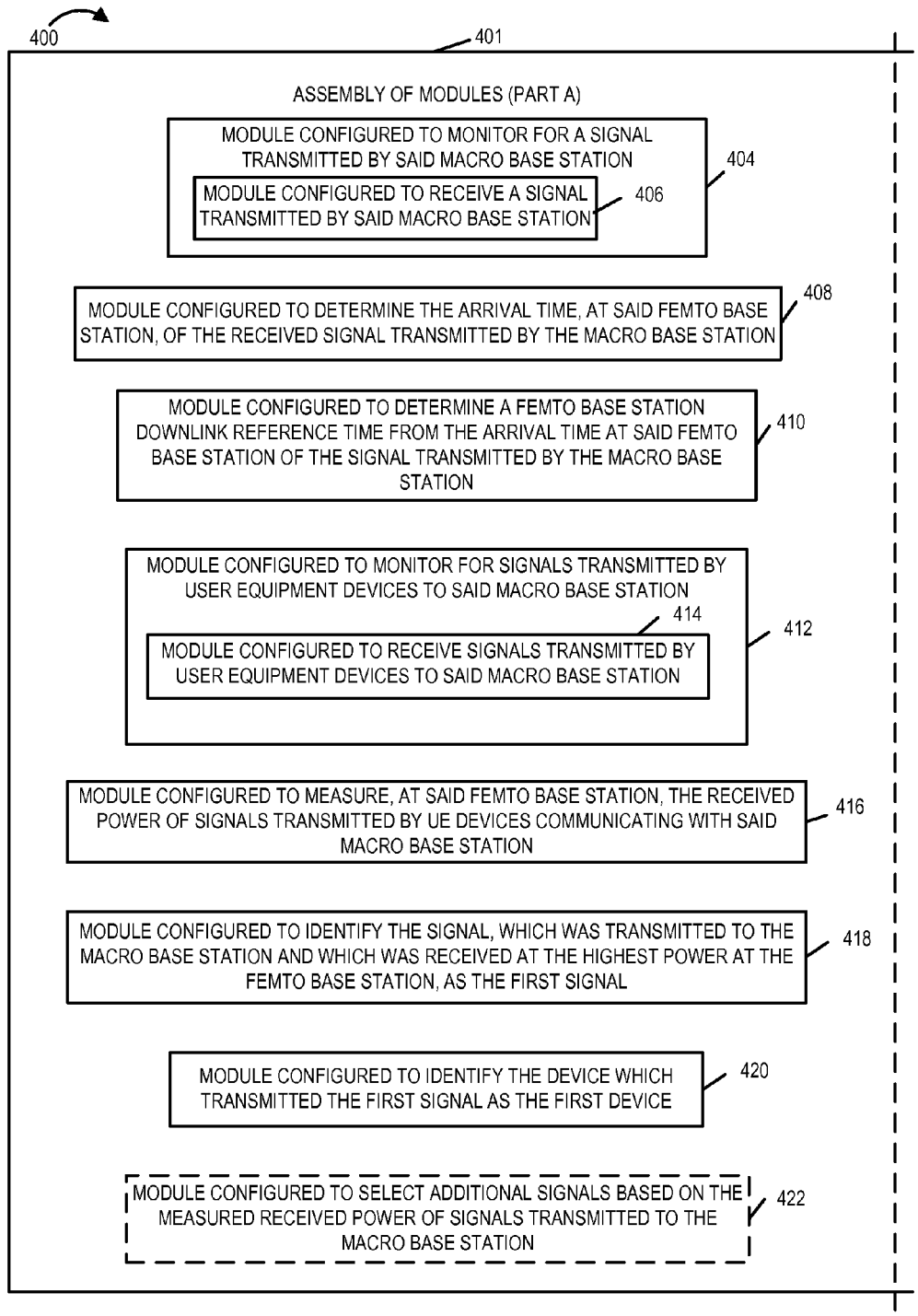
FIG. 6A is a drawing of a first portion of an assembly of modules, which can, and in some embodiments is, used in the exemplary femto base station illustrated in FIG. 5.
Figures 6, 6B:
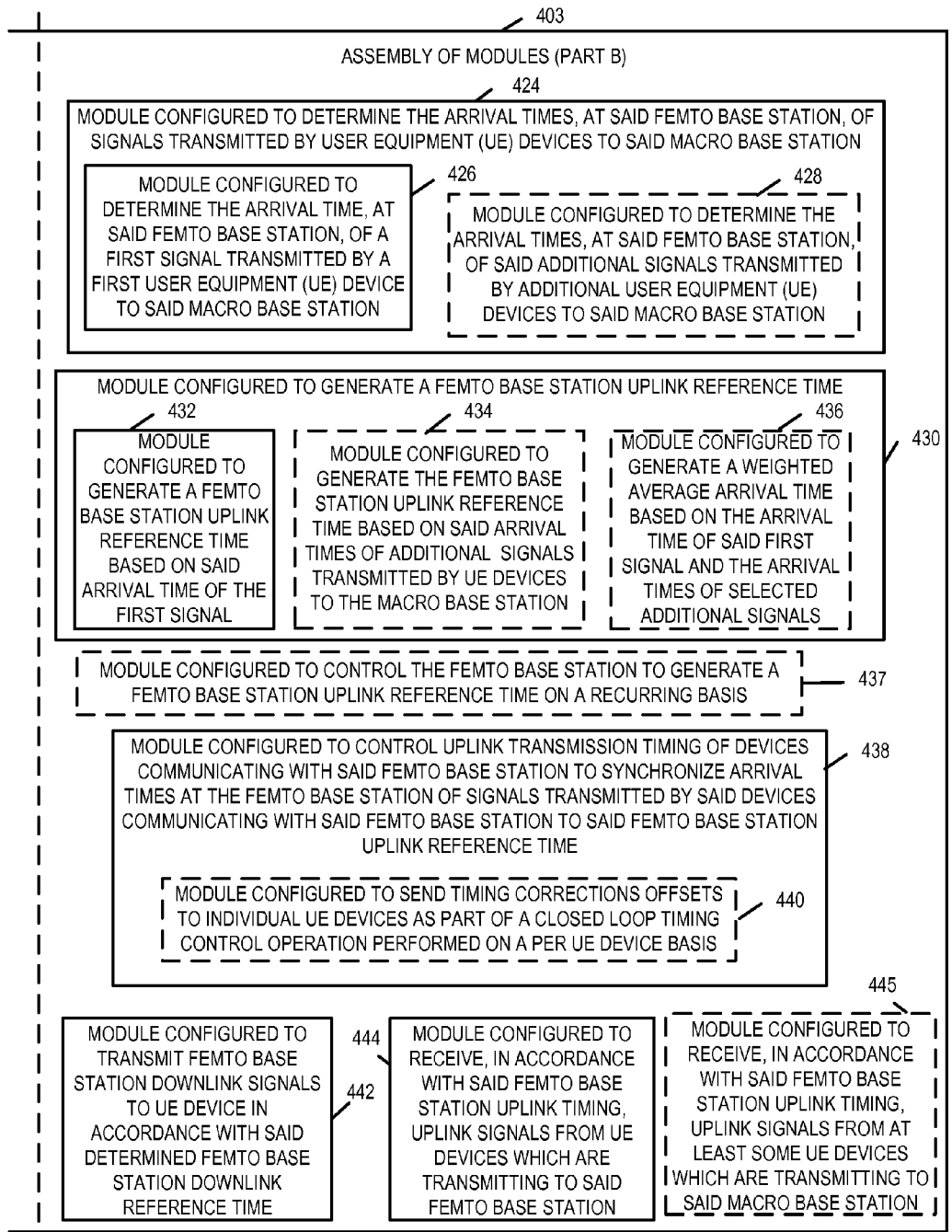
FIG. 6B is a drawing of a second portion of an assembly of modules, which can, and in some embodiments is, used in the exemplary femto base station illustrated in FIG. 5.

FIG. 6, comprising the combination of FIG. 6A and FIG. 6B, is a drawing illustrating an assembly of modules 400, which can, and in some embodiments is, used in the exemplary femto base station 300 illustrated in FIG. 5. The modules in the assembly 400 can be implemented in hardware within the processor 302 of FIG. 5, e.g., as individual circuits. Alternatively, the modules may be implemented in software and stored in the memory 304 of femto base station 300 shown in FIG. 5. In some such embodiments, the assembly of modules 400 is included in routines 311 of memory 304 of femto base station 300 of FIG. 5. While shown in the FIG. 5 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In some embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 6 control and/or configure the femto base station 300 or elements therein such as the processor 302, to perform the functions of the corresponding steps illustrated and/or described in the method of flowchart 200 of FIG. 4.

FIG. 6 is a drawing of an assembly of modules 400 in accordance with various embodiments. Assembly of modules 400 includes Part A 401 and part B 403. Assembly of modules 400 includes a module 404 configured to monitor for a signal transmitted by a macro base station. Module 404 includes a module 406 configured to receive a signal transmitted by said macro base station. Assembly of modules 400 further includes a module 408 configured to determine the arrival time, at said femto base station, of the received signal transmitted by the macro base station, and a module 410 configured to determine a femto base station downlink reference time from the arrival time at the femto base station of the signal transmitted by the macro base station.

Assembly of modules 400 further includes a module 412 configured to monitor for signals transmitted by user equipment devices to said macro base station. Module 412 includes a module 414 configured to receive signals transmitted by user equipment devices to said macro base station. Assembly of modules 400 further includes a module 416 configured to measure, at said femto base station, the received power of signals transmitted by UE devices communicating with said macro base station, a module 418 configured to identify the signal which was transmitted to the macro base station and which was received at the highest power at femto base station as the first signal, a module 420 configured to identify the UE device which transmitted the first signal as first UE device. In various embodiments, the first signal is one of a plurality of signals transmitted by UE devices communicating with the macro base station. In some embodiments, assembly of modules 400 further includes a module 422 configured to select additional signals based on the measured received power of signals transmitted to the base station. In various embodiments, module 422 selects the highest power received signals after the first signal as the additional signals since it is likely that those signals correspond to the UE devices communicating with the macro base station which are closest to the femto base station. In some embodiments, module 422 selects signals transmitted by UE devices to the macro base station which are received at the femto base station at a power level above a minimum power threshold level indicative of being near the femto base station as additional signals to be used in the femto base station uplink reference time generation and does not select received signals transmitted by UE devices to the macro base station which are not received at the femto base station at a received power level exceeding the minimum power threshold level. In some embodiments module 422 selects at most a predetermined number of received signals from different UE devices which satisfy the test criteria, e.g., the predetermined number of received signals from different UE devices corresponding to the highest received power signals satisfying the predetermined power threshold criteria.

Assembly of modules 400 further includes a module 424 configured to determine the arrival times, at the femto base station, of signals transmitted by UE devices to said macro base station. Module 424 includes module 426, and in some embodiments, further includes module 428. Module 426 is a module configured to determine the arrival time, at said femto base station, of a first signal transmitted by a first user equipment device to said macro base station. Module 428 is a module configured to determine the arrival times, at said femto base station, of said additional signals transmitted by additional UE devices to said macro base station.

Assembly of modules 400 further includes a module 430 configured to generate a femto base station uplink reference time. Module 430 includes a module 432 configured to generate a femto base station uplink reference time based on the arrival time of the first signal. In some embodiments, module 430 further includes one or both of a module 434 configured to generate the femto base station uplink reference time based on said arrival times of additional signals transmitted by UE devices to the macro base station and a module 436 configured to generate a weighted average arrival time based on the arrival time of said first signal and the arrival times of selected additional signals.

Assembly of modules 400 further includes a module 438 configured to control uplink transmission timing of devices, communicating with said femto base station to synchronize the arrival time at the femto base station of signals transmitted by said devices communicating with said femto base station to the femto base station uplink reference timing. In some embodiments, module 438 controls the synchronization to the arrival time at said femto base station to be within the duration of a cyclic prefix used by user equipment devices transmitting to the macro base station. In various embodiments, the femto cell and macro cell use symbols with the same cyclic prefix length. In some embodiments, module 438 controls the synchronization to the arrival time at said femto base station to be within a duration which is shorter than a cyclic prefix. In some such embodiments, the duration is shorter than a cyclic prefix by an amount which is a function of the possible slight allowable distance variations of the UE device or devices from the femto base station, which are used to take measurements to generate the femto base station uplink reference time. Module 438 includes a module 440 configured to send timing correction offsets to individual UE devices as part of a closed loop timing control operation performed on a per UE device basis.

Assembly of modules 400 further includes a module 442 configured to transmit femto base station downlink signals to UE devices in accordance with said determined femto base station downlink reference time, and a module 444 configured to receive, in accordance with said femto base station uplink timing, uplink signals from UE devices which are transmitting to said femto base station. In some embodiments, assembly of modules 400 includes a module 445 configured to receive, in accordance with said femto base station uplink timing, uplink signals from at least some UE devices which are transmitting uplink signals to said macro base station, e.g., some UE devices transmitting uplink signals to the macro base station which are in the local vicinity of the femto base station.

In some embodiments, assembly of modules 400 includes a module 437 configured to control the femto base station to generate a femto base station uplink reference time on a recurring, e.g., periodic, basis.

Figure 7:
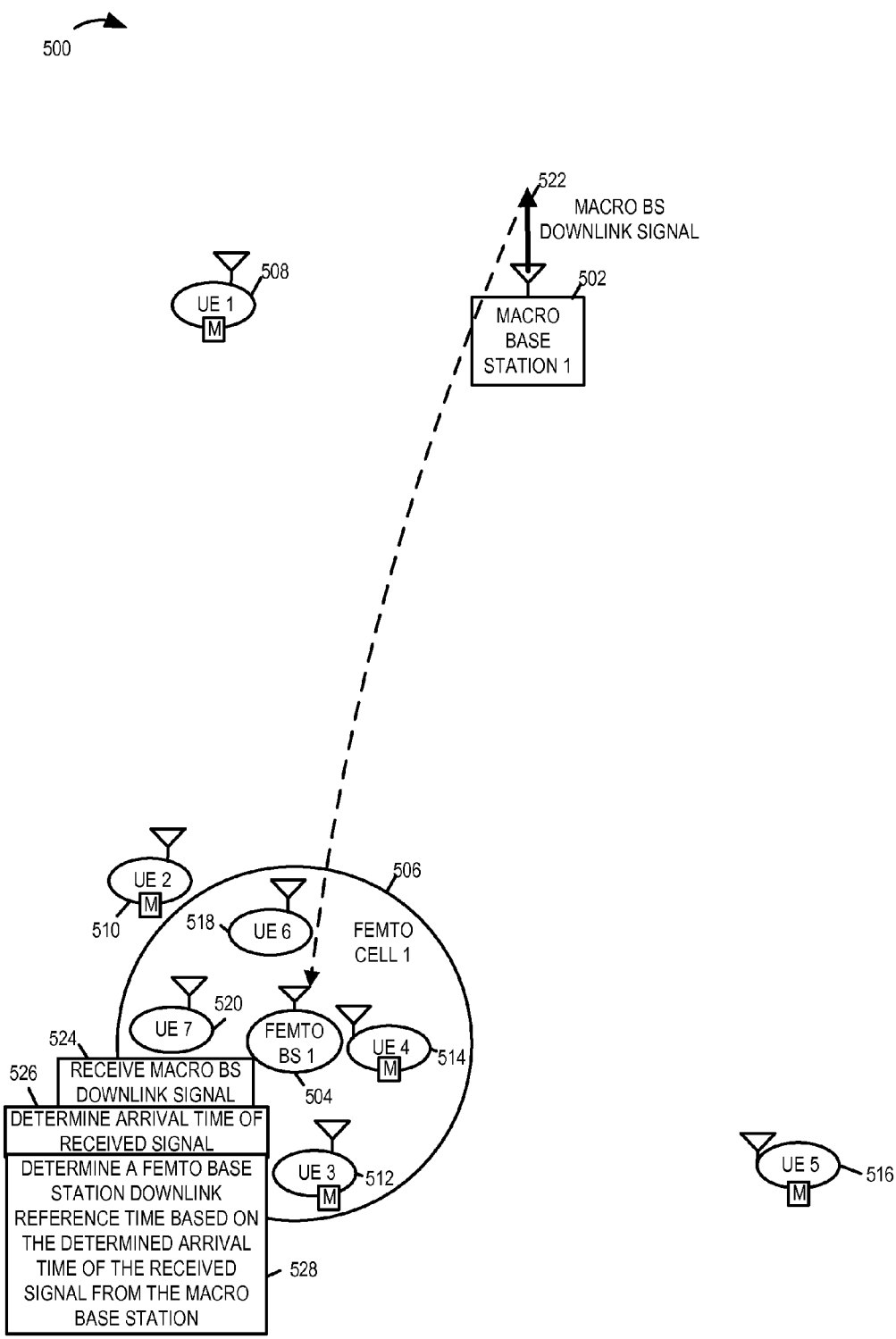
FIG. 7 illustrates an example in which a femto base station determines femto base station downlink timing in accordance with an exemplary embodiment.

FIGS. 7-10 illustrate an example of operating a femto base station located within the coverage area of a macro base station in accordance with an exemplary embodiment. Drawing 500 of FIG. 7 illustrates exemplary macro base station 1 502, exemplary femto base station 1 504 with corresponding femto cell 1 506, and a plurality of user equipment devices (UE 1 508, UE 2 510, UE 3 512, UE 4 514, UE 5 516, UE 6 518, UE 7 520). Macro base station 1 502 is, e.g., one of the macro base stations of system 100 of FIG. 3. Femto base station 1 504 and the UE devices (508, 510, 512, 514, 516, 518, 520) are located within the cellular coverage area of macro base station 1 502. Femto base station 1 504 is, e.g., one of the femto base stations of system 100 of FIG. 3 and/or a femto base station implementing a method in accordance with flowchart 200 of FIG. 4 and/or implemented in accordance with femto base station 300 of FIG. 5. The UE devices (UE 1 508, UE 2 510, UE 3 512, UE 4 514, UE 5 516, UE 6 518, UE 7 520), are, e.g., any of the UE devices of system 100 of FIG. 3. Consider that UE devices (UE 1 508, UE 2 510, UE 3 512, UE 4 514, UE 5 516) are currently communicating with and being closed loop timing controlled by the macro base station 1 502, as indicated by the box with an "M" on each UE device (508, 510, 512, 514, 516).

Macro base station 1 502 transmits a downlink signal 522, which is received by femto base station 1 504, as indicated by block 524. The femto base station 504 determines the arrival time of the received signal 522, as indicated by block 526. The femto base station 504 determines a femto base station downlink reference time based on the determined arrival time of the received signal from the macro base station, as indicated by block 528. Thus femto base station 504 derives its downlink timing from the signal 522 transmitted by the macro base station 502.

Figure 8:
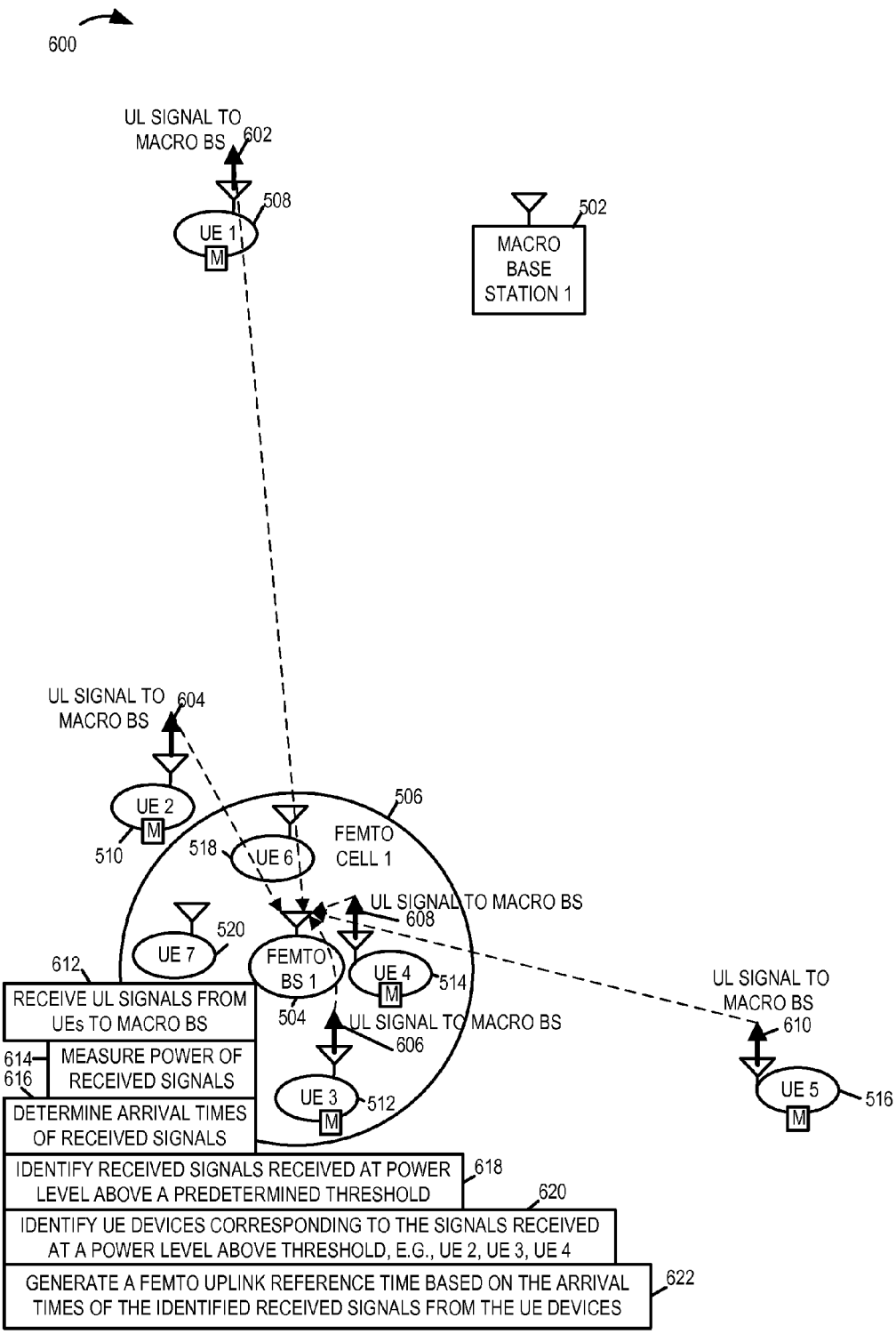
FIG. 8 illustrates an example in which a femto base station determines femto base station uplink timing in accordance with an exemplary embodiment.

The example continues with FIG. 8. In drawing 600 of FIG. 8, the UE devices (UE 1 508, UE 2 510, UE 3 512, UE 4 514, UE 5 516), transmit UL signals (602, 604, 606, 608, 610), respectively, to macro base station 1 502, as part of their normal communications with macro base station 502. In various embodiments, the signals (602, 604, 606, 608, 610) are transmitted at the same transmission power level, e.g., a known reference power level. In some embodiments, the signals (602, 604, 606, 608, 610) are power controlled by the macro base station, i.e., they are transmitted at a power level such that they are received at a known reference power level at the macro base station. Femto base station 504 receives the UL signals (602, 604, 606, 608, 610) transmitted to the macro base station, as indicated by block 612. The femto base station 504 measures the received power of the detected received signals which were transmitted to the macro base station, as indicated by block 614. The femto base station 504 determines the arrival times at the femto base station of the detected received signals which were transmitted to the macro base station, as indicated by block 616. The femto base station 504 identifies the received signals which were received at a power level above a predetermined threshold, e.g., a threshold indicating the UE device which transmitted the received signal is in the local vicinity of the femto base station, as indicated by block 618. In this example, consider that signals 604, 606 and 608 are received at a power level above the threshold. The femto base station 504 identifies the UE devices corresponding to the signals received at a power level above the threshold, as indicated by block 620. For example, UE devices (UE 2, UE 3, and UE 4) are identified. In some embodiments, the femto base station identifies the signal received at the highest power level which was above the threshold and the corresponding UE device which transmitted the signal, e.g., signal 608 and UE device 4 514. The femto base station 504 generates a femto uplink reference time based on the arrival times of the identified received signals from the UE devices, as indicated by block 622. In some embodiments, the femto uplink reference time is based on the arrival time of the highest power received signal. In some embodiments, the femto base station uplink reference time is set to match the uplink reference time being used by the UE device which transmitted the highest power received signal to the macro base station. In some embodiments, the femto uplink reference time is based on the arrival time of the highest power received signal and the arrival time of additional signals which also satisfy the threshold criteria, e.g., a weighted average arrival time is generated.

Figure 9:
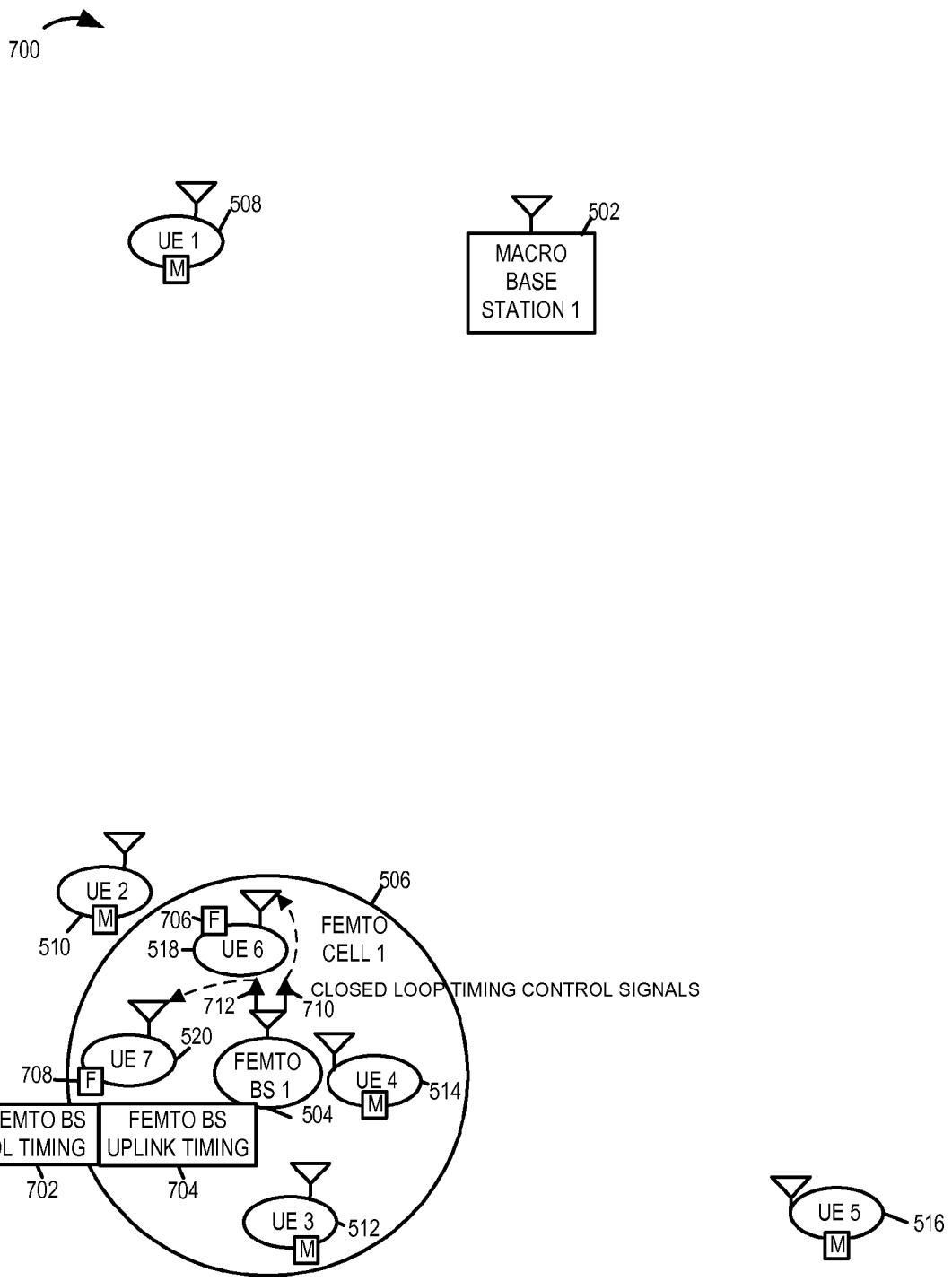
FIG. 9 illustrates an example in which a femto base station closed loop timing controls UE devices in accordance with an exemplary embodiment.

The example continues with FIG. 9. In drawing 700 of FIG. 9, the femto base station 504 has a determined femto base station downlink timing 702, which was determined in the steps described in FIG. 7, and a determined femto base station uplink timing 704, which was determined in the steps described in FIG. 8. Consider that the femto base station 504 establishes femto cell communications with UE device 7 520 and UE device 6 518, as indicated by blocks (708, 706), respectively with the letter "F". As part of controlling the uplink transmission timing of UE devices communicating with the femto base station 504 to synchronize reception of femto UL signals at femto base station 504, the femto base station transmits closed loop timing control signals (710, 712) to UE devices (518, 520), respectively. In some embodiments, the timing control signals (710, 712) include timing correction offsets which are performed on a per device basis, e.g., each device (518, 520) is individually closed loop timing controlled by femto base station 504.

Figure 10:
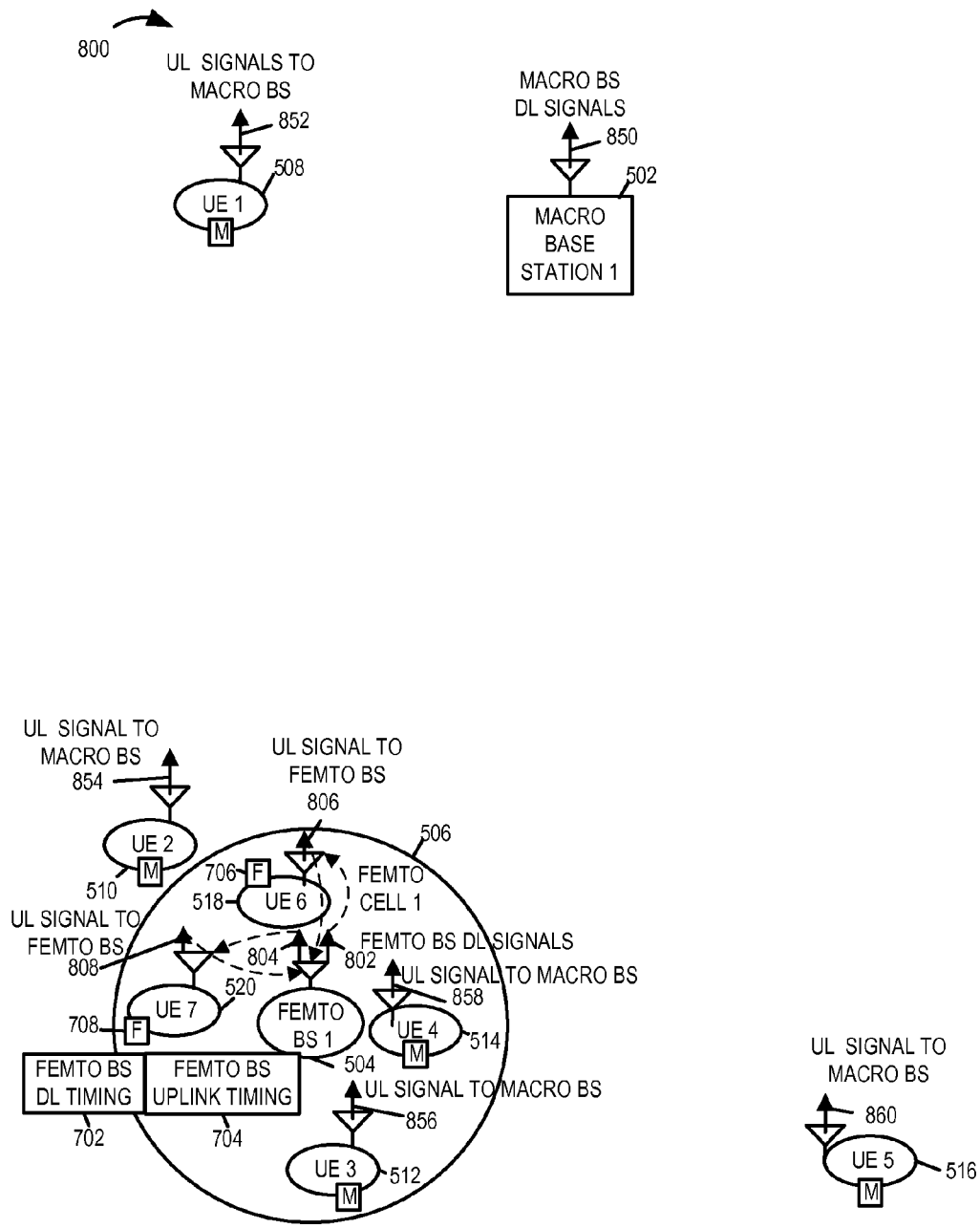
FIG. 10 illustrates an example, in which a femto base station communicates with UE devices concurrently with a macro base station communicating with UE devices, in accordance with an exemplary embodiment.

The example continues with FIG. 10. In drawing 800 of FIG. 10, femto base station transmits femto base station downlink signals (802, 804) to UE devices (UE 6 518, UE 7 520) in accordance with the femto base station downlink timing 702. UE devices (UE 6 518, UE 7 520) transmit femto base station uplink signals (806, 808), respectively to femto base station 504 such that the signals are received at the femto base station 504 in accordance with the femto base station uplink timing 704.

In addition to the femto cell communications, macro cell communications may be, and sometimes are occurring concurrently. Macro base station 502 transmits macro base station downlink signals 850 to one or more or all of UE devices (508, 510, 512, 514, 516). UE devices (508, 510, 512, 514, 516) transmit UL signals (852, 854, 856, 858, 860) to macro base station 850.

In some embodiments, the downlink signals (850, 802, 804) are downlink traffic channel signals. In some embodiments, the uplink signals (852, 854, 856, 858, 860, 806, 808) are uplink traffic channel signals.

In various embodiments, the timing is controlled such that macro UL signals and femto uplink signals are received in synchronization at the femto base station, e.g., to within the duration of a cyclic prefix. In various embodiments, the timing is controlled such that at macro UL signals and femto uplink signals are received in synchronization at the macro base station, e.g., to within the duration of a cyclic prefix.

Since the UL transmissions are synchronous, e.g., to within the duration of a cyclic prefix, at both the femto base station and the macro cell base station, they can, and in some embodiments do, use the same subframe by implementing frequency division multiplexing (FDM).

In various embodiments, the femto base station 504, is able to, and sometimes does not only receive and recover information communicated in femto uplink signals (806, 808) but is also able to receive and recover at least some information communicated concurrently in macro base station uplink signals, e.g., information from macro BS uplink signals (856, 858). Thus, in at least some embodiments, the femto base station 504 may, and sometimes does eavesdrop on macro base station communications transmitted from UE devices located in its vicinity in addition to supporting its own femto base station communications.

In various embodiments, the femto base station 504 resets, e.g., periodically resets, and/or adjusts its femto base station uplink reference time based on new measurements.

In some embodiments, the femto base station 504 may explicitly request one of the UE devices communicating with itself, e.g., UE 7 520 to communicate with the macro base station and acquire the timing correction. The UE then can report the offset between its uplink and downlink time to the femto base station. Femto base station can then use this offset to generate its own uplink reference time. Femto base station can choose the UE device based on the received power of the signal transmitted by the UE device which is indicative of the vicinity of the UE device with respect to the femto base station.

Various aspects and/or features of some, but not necessarily all embodiments, are further described below. Various embodiments are directed to a method of adjusting the uplink (UL) timing of small cell base stations, e.g., femto cell base stations, to receive UL transmissions from UEs. The new UL timing approach allows small cell base stations, e.g., femto cell base stations, to decode transmissions of UEs attached to a macro or other closeby small cell base station without maintaining multiple UL timings. It also allows the macro cell and small cells to do fractional frequency reuse (FFR) without spilling into each others' bands.

The solution proposes that the small cell base stations, e.g., femto or pico cell base stations, maintain two different timings: one for DL transmissions and one for UL transmissions. The timings in some embodiments, are such that DL transmissions of the macro cell base station and the small cell base station, e.g., femto cell base station, are synchronous, e.g., to within the duration of a cyclic prefix, at a UE device positioned within range of a small cell base station. Similarly, the UL transmissions of a UE device in communication with a small cell base station, e.g., a femto cell base station, and a UE device in communication with the macro cell base station are synchronous, e.g., to within the duration of a cyclic prefix, at both the small cell base station, e.g., femto cell base station, and the macro cell base station.

Since the range of a small cell base station, e.g., femto cell base station, is much smaller than a range of the macro cell base station, the propagation delay between the small cell base station, and the UE device is negligible compared to the cyclic prefix (CP) length. Hence the DL timing used by the small cell, in some embodiments, is the time when the DL signal of the macro cell base station arrives at the small cell base station, e.g., femto cell base station. The small cell base station, e.g., femto cell base station, in some embodiments, acquires this time in NETWORK_LISTEN mode by listening to signals transmitted on the DL by the macro cell base station. The UL time of the small cell, in some embodiments, is such that if the small cell base station were to transmit using this timing, its signal would arrive at the macro cell base station at the macro cell's UL time. In other words, it is the UL time that a UE device at the small cell's location would use.

A small cell base station, e.g., a femto base station, located in a coverage area of a macro base station, determines UL timing for the small cell base station, e.g., femto base station, in the following way. The small cell base station, e.g., femto base station, listens, e.g., when the small cell base station is idle, to the UL transmission of one or more close by UEs connected to the macro cell base station. In some embodiments, the small base station, e.g., femto base station, use the UE's timing of one of the UEs connected to the macro base station as its own UL reference timing, e.g., the UE connected to the macro base station which is closest to the small cell base station. In some embodiments, the small cell base station, e.g., femto base station, determines its uplink timing based on uplink timing of one or more UEs connected to the macro base station which are in the vicinity of the small cell base station. The small cell base station can, and in some embodiments does, estimate the distance of a UE from the small cell base station from the received signal strength at the small cell base station of the UE's transmission to the macro base station. The small cell base station, in some embodiments, periodically updates its UL timing, e.g., by combining multiple timings acquired from receiving multiple UE transmissions. The small cell base station's UL timing can be, and in some embodiments is, a weighted average of the received multiple UL timings.

Using this scheme, the small cell base station need not maintain two different UL timings and thus can listen to its own UEs as well as detect the presence of UEs in communication with the macro cell base station without requiring two different timings.

Since the UL transmissions are synchronous, e.g., to within the duration of a cyclic prefix, at both the small cell base station and the macro cell base station, they can, and in some embodiments do, use same subframe by implementing frequency division multiplexing (FDM).

In various embodiments, the femto base station resets, e.g., periodically resets, and/or adjusts its femto base station uplink reference time based on new measurements.

Figure 11:
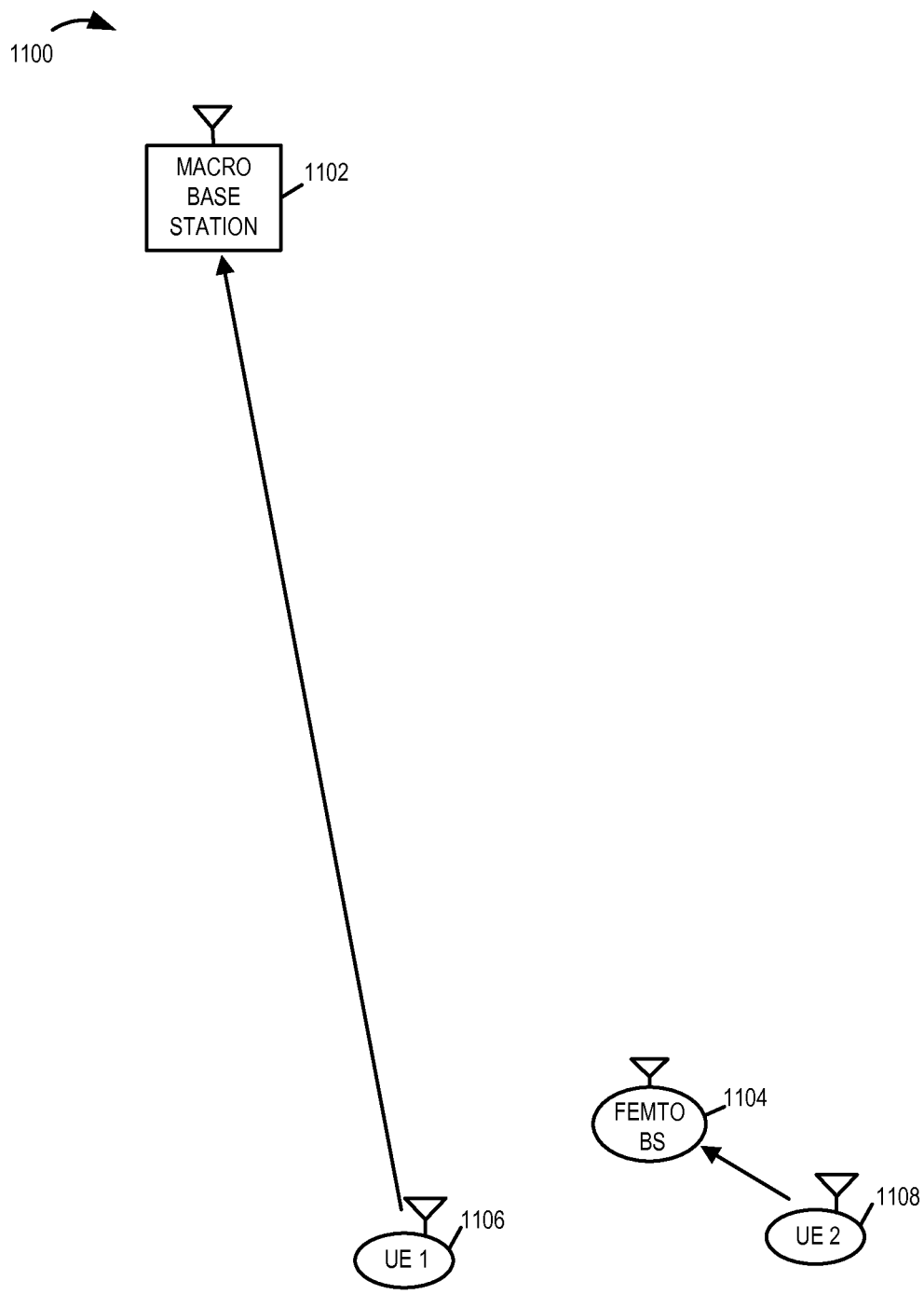
FIG. 11 illustrates an exemplary deployment including a macro base station, a femto base station, and a couple of UE devices in accordance with an exemplary embodiment.

Drawing 1100 of FIG. 11 illustrates an exemplary deployment of a macro base station 1102 and a femto base station 1104 in accordance with an exemplary embodiment. In FIG. 11, user equipment device 1 (UE 1) 1106 is shown communicating with the macro base station 1102; user equipment device 2 (UE 2) 1108 is shown communicating with the femto base station 1104. The devices (1102, 1104, 1106, 1108) of FIG. 11 are, e.g., devices (102, 110, 128, 134) of system 100 of FIG. 3. Femto base station 1104 may be femto base station 300 of FIG. 5 and/or a femto base station implementing a method in accordance with flowchart 200 of FIG. 4. Drawing 1200 of FIG. 12 illustrates exemplary UL and DL timing at each node (macro base station 1102, UE device 1 1106, femto base station 1104, UE device 2 1108). Horizontal line 1202 represents time. First row 1204 is used to illustrate DL and UL timing of the macro base station 1102; second row 1206 is used to illustrate DL timing of UE1 1106; third row 1208 is used to illustrate UL timing of UE 1 1106. Fourth row 1210 is used to illustrate timing of a UE 2 1108 transmitted signal arriving at macro base station 1102. Fifth row 1212 is used to illustrate DL timing of the femto base station 1104; sixth row 1214 is used to illustrate UL timing of the femto base station 1104; seventh row 1216 is used to illustrate DL timing of UE2 1108; eighth row 1218 is used to illustrate UL timing of UE 2 1108. Ninth row 1220 is used to illustrate timing of a UE 1 1106 transmitted signal arriving at femto base station 1104. Note that there is no timing discrepancy at the femto base station and macro base station with regard received uplink signals. In particular, with regard to the macro base station, the uplink timing of the macro base station as indicated by line 1204 is synchronized with the UE 2 signal arriving at the macro base station as indicated by line 1210. With regard to the femto base station, the uplink timing of the femto base station as indicated by line 1214 is synchronized with the UE 1 signal arriving at the femto base station as indicated by line 1220.

In various embodiments a device, e.g., a femto base station in system 100 of FIG. 3, and/or a femto base station 300 of FIG. 5, and/or a femto base station of any of the FIGS. 3-12 includes a module corresponding to each of the individual steps and/or operations described with regard to any of the FIGS. 3-12 in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the device, e.g., femto base station, cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations including femto base stations and macro base stations, and/or communications systems. Various embodiments are also directed to methods, e.g., method of controlling and/or operating network nodes, mobile nodes, access points such as base stations including macro base stations and femto base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a communications node such as a femto base station, including a processor configured to implement one, multiple or all of the steps of one or more methods of the invention.

In some embodiments, the processor or processors, e.g., CPUs, of one or more devices, e.g., communications nodes such as network nodes, access nodes such as base stations including macro base stations and femto base stations and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., a communications node such as a femto base station, with a processor which includes a module corresponding to each of the steps of the various described methods performed by the device in which the processor is included. In some but not all embodiments a device, e.g., a communications node such as a femto base station, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points such as macro base stations and femto base stations which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a femto base station within a coverage area of a macro base station, the method comprising:

determining the arrival times at said femto base station of a first signals transmitted to said macro base station by different user equipment (UE) device, said multiple signals including a first signal transmitted by a first user equipment (UE) device to said macro base station and additional signals transmitted by other different UE devices;

generating, at said femto base station, a femto base station uplink reference time based on said determined arrival times at said femto base station of the multiple signals including said first signal transmitted to said macro base station, said generating including generating an average arrival time based on the arrival time of said first signal and the arrival times of said additional signals transmitted to said macro base station by said other different UE devices and using the average arrival time to generate said femto base station uplink reference time, said additional signals used in generating said average arrival time being signals that are received at the femto base station at a power level above a predetermined threshold indicating that the UE devices which transmitted the additional signals are in the local vicinity of said femto base station; and controlling uplink transmission timing of devices communicating with said femto base station to synchronize arrival times at said femto base station of signals, transmitted by said devices communicating with said femto base station to said femto base station uplink reference time.

2. The method of claim 1, wherein said synchronization of the arrival time at said femto base station is to within a duration of a cyclic prefix used by user equipment devices transmitting to said macro base station.

3. The method of claim 2, further comprising:
measuring, at said femto base station, the received signal power of signals transmitted by UE devices communicating with said macro base station; and
wherein said first UE device is a UE device from which said femto base station received a highest power signal to said macro base station.

4. The method of claim 1, further comprising:
selecting said additional signals based on measured received power of said additional signals transmitted to said macro base station.

5. The method of claim 4, wherein said average is a weighted average arrival time.

6. The method of claim 1, further comprising;
determining a femto base station downlink reference time from the arrival time at said femto base station of a signal transmitted by said macro base station.

7. A femto base station within a coverage area of a macro base station, the femto base station comprising:
means for determining arrival times at said femto base station of multiple signals transmitted to said macro base station by different user equipment (UE) devices, said multiple signals including a first signal transmitted by a first user equipment (UE) device to said macro base station and additional signals transmitted by other UE devices;
means for generating a femto base station uplink reference time based on said determined arrival times at said femto base station of the multiple signals including said first signal transmitted to said macro base station, said means for generating a femto base station uplink reference time including means for generating an average arrival time based on the arrival time of said first signal and the arrival times of said additional signals at said femto base station, said additional signals used in generating said average arrival time being signals that are received at the femto base station at a power level above a predetermined threshold indicating that the UE devices which transmitted the additional signals are in the local vicinity of said femto base station; and
means for controlling uplink transmission timing of devices communicating with said femto base station to synchronize arrival times at said femto base station of signals transmitted by said devices communicating with said femto base station to said femto base station uplink reference time.

8. The femto base station of claim 7, wherein said synchronization of the arrival time at said femto base station is to within a duration of a cyclic prefix used by user equipment devices transmitting to said macro base station.

9. The femto base station of claim 8, further comprising:
means for measuring, at said femto base station, the received signal power of signals transmitted by UE devices communicating with said macro base station; and
wherein said first UE device is a UE device from which said femto base station received a highest power signal to said macro base station.

10. The femto base station of claim 7, further comprising:
means for selecting said additional signals based on measured received power of said additional signals transmitted to said macro base station.

11. The femto base station of claim 10, wherein said average arrival time is a weighted average arrival time.

12. The femto base station of claim 7, further comprising:
means for determining a femto base station downlink reference time from the arrival time at said femto base station of a signal transmitted by said macro base station.

13. A computer program product for use in a femto base station within the coverage area of a macro base station, the computer program product comprising:
a non-transitory computer readable medium comprising:
code for causing at least one computer to determine arrival times at said femto base station of multiple signals transmitted to said macro base station by different user equipment (UE) devices, said multiple signals including a first signal transmitted by a first user equipment (UE) device to said macro base station and additional signals transmitted by other UE devices;
code for causing said at least one computer to generate a femto base station uplink reference time based on said determined arrival times at said femto base station of the multiple signals including said first signal transmitted to said macro base station, said code including code for causing said at least one computer to generate an average arrival time based on the arrival time of said first signal and the arrival times of said additional signals transmitted by other UE devices, said additional signals used in generating said average arrival time being signals that are received at the femto base station at a power level above a predetermined threshold indicating that the UE devices which transmitted the additional signals are in the local vicinity of said femto base station; and
code for causing said at least one computer to control uplink transmission timing of devices communicating with said femto base station, to synchronize arrival times at said femto base station of signals transmitted by said devices communicating with said femto base station to said femto base station uplink reference time.

14. A femto base station within the coverage area of a macro base station, the femto base station comprising:
at least one processor configured to:
determine the arrival times, at said femto base station of multiple signals transmitted to said macro base station by different user equipment (UE) devices, said multiple signals including a first signal transmitted by a first user equipment (UE) device to said macro base station and additional signals transmitted by other UE devices;
generate a femto base station uplink reference time based on said determined arrival times at said femto base station of the multiple signals including said first signal transmitted to said macro base station, said generating a femto base station uplink reference time including generating an average arrival time based on the arrival time of said first signal and the arrival times of said additional signals transmitted by other UE devices, said additional signals used in generating said average arrival time being signals that are received at the femto base station at a power level above a predetermined threshold indicating that the UE devices which transmitted the additional signals are in the local vicinity of said femto base station; and control uplink transmission timing of devices communicating with said femto base station to synchronize arrival times at said femto base station of signals transmitted by said devices communicating with said femto base station to said femto base station uplink reference time; and memory coupled to said at least one processor.

15. The femto base station of claim 14, wherein said synchronization of the arrival time at said femto base station is to within a duration of a cyclic prefix used by user equipment devices transmitting to said macro base station.

16. The femto base station of claim 15, wherein said at least one processor is further configured to:

measure, at said femto base station, the received signal power of signals transmitted by UE devices communicating with said macro base station; and wherein said first UE device is a UE device from which said femto base station received a highest power signal to said macro base station.

17. The femto base station of claim 14, wherein said at least one processor is further configured to select said additional signals based on measured received power of said additional signals transmitted to said macro base station.

* * * * *